United States Patent
Cahill

(10) Patent No.: US 9,061,674 B2
(45) Date of Patent: Jun. 23, 2015

(54) BRAKING SYSTEM AND METHOD OF DETECTING A FAILURE OF A BRAKE ACTUATOR

(71) Applicant: Eric Daniel Cahill, Troy, OH (US)

(72) Inventor: Eric Daniel Cahill, Troy, OH (US)

(73) Assignee: GOODRICH CORPORATION, Charlotte, NC (US)

(*) Notice: Subject to any disclaimer, the term of this patent is extended or adjusted under 35 U.S.C. 154(b) by 234 days.

(21) Appl. No.: 13/659,344

(22) Filed: Oct. 24, 2012

(65) Prior Publication Data

US 2014/0110195 A1 Apr. 24, 2014

(51) Int. Cl.
*B60T 13/74* (2006.01)
*B60T 8/17* (2006.01)
*B60T 8/88* (2006.01)

(52) U.S. Cl.
CPC ............ *B60T 13/741* (2013.01); *B60T 8/1703* (2013.01); *B60T 8/885* (2013.01); *B60T 2270/406* (2013.01)

(58) Field of Classification Search
CPC ................................. B60T 17/22; B60T 25/44
USPC ............ 188/71.9, 72.8, 72.1, 72.6, 72.7, 162, 188/265; 303/20, 89, 162
See application file for complete search history.

(56) References Cited

U.S. PATENT DOCUMENTS

| 6,480,130 B1 | 11/2002 | Hanson et al. |
| 7,540,571 B2 * | 6/2009 | Yamaguchi ..................... 303/89 |
| 7,849,976 B2 * | 12/2010 | Kawahara et al. ....... 188/1.11 E |
| 2013/0048443 A1 * | 2/2013 | Muramatsu et al. ......... 188/72.1 |

FOREIGN PATENT DOCUMENTS

| EP | 1826081 A2 | 8/2007 |
| GB | 2469891 A | 11/2010 |
| WO | 2005001303 A2 | 1/2005 |

OTHER PUBLICATIONS

Search Report regarding related EP App. No. 13189875.1-1756 dated Jan. 21, 2014; 8 pgs.

* cited by examiner

*Primary Examiner* — Melanie Torres Williams
(74) *Attorney, Agent, or Firm* — Cantor Colburn LLP

(57) ABSTRACT

A method of detecting a failure of a brake actuator is provided. The method includes monitoring an angular position of a motor controlling the brake actuator. Also included is monitoring a linear position of a linear translation arrangement of the brake actuator, wherein the linear position of the linear translation arrangement is controlled by a gear assembly in communication with the motor and the linear translation arrangement. Further included is comparing the linear position of the linear translation arrangement with the angular position of the motor. Yet further included is determining whether the linear position of the linear translation arrangement is within a predetermined range of linear positions corresponding to a plurality of angular positions.

16 Claims, 3 Drawing Sheets

BRAKING SYSTEM AND METHOD OF DETECTING A FAILURE OF A BRAKE ACTUATOR

BACKGROUND OF THE INVENTION

The present invention relates to aircrafts, and more particularly to a braking system of an aircraft, as well as a method of detecting a failure of a brake actuator of the aircraft.

Braking systems are employed in a wide range of vehicles and industrial applications. In many cases, a braking system includes an actuator that acts upon a braking element. The actuator may be mechanical, electrical, hydraulic or a combination thereof. In the case of an electrical or electro-mechanical actuator, a motor may be employed to drive the actuator. The motor drives the actuator with a gear assembly that provides a gear reduction and converts rotational motion to translational motion of a linear driving element used to displace the braking element. Failure of one or more of the above components lead to inefficient and ineffective braking and detection of such a failure is desirable. Several detection methods have been attempted, but typically include time-consuming manual inspection of the braking system components.

BRIEF DESCRIPTION OF THE INVENTION

According to one embodiment, a method of detecting a failure of a brake actuator is provided. The method includes monitoring an angular position of a motor controlling the brake actuator. Also included is monitoring a linear position of a linear translation arrangement of the brake actuator, wherein the linear position of the linear translation arrangement is controlled by a gear assembly in communication with the motor and the linear translation arrangement. Further included is comparing the linear position of the linear translation arrangement with the angular position of the motor. Yet further included is determining whether the linear position of the linear translation arrangement is within a predetermined range of linear positions corresponding to a plurality of angular positions.

According to another embodiment, a braking system includes a support plate. Also included is at least one brake actuator operably coupled to the support plate, the at least one brake actuator including an actuator plate in communication with a gear assembly for converting rotational motion to linear motion of a linear translation arrangement. Further included is an angular position sensor for determining an angular position of a motor of the at least one brake actuator. Yet further included is a linear position sensor for determining a linear position of the linear translation arrangement. Also included is a controller for determining whether the linear position is within a predetermined range of linear positions corresponding to a plurality of angular positions.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
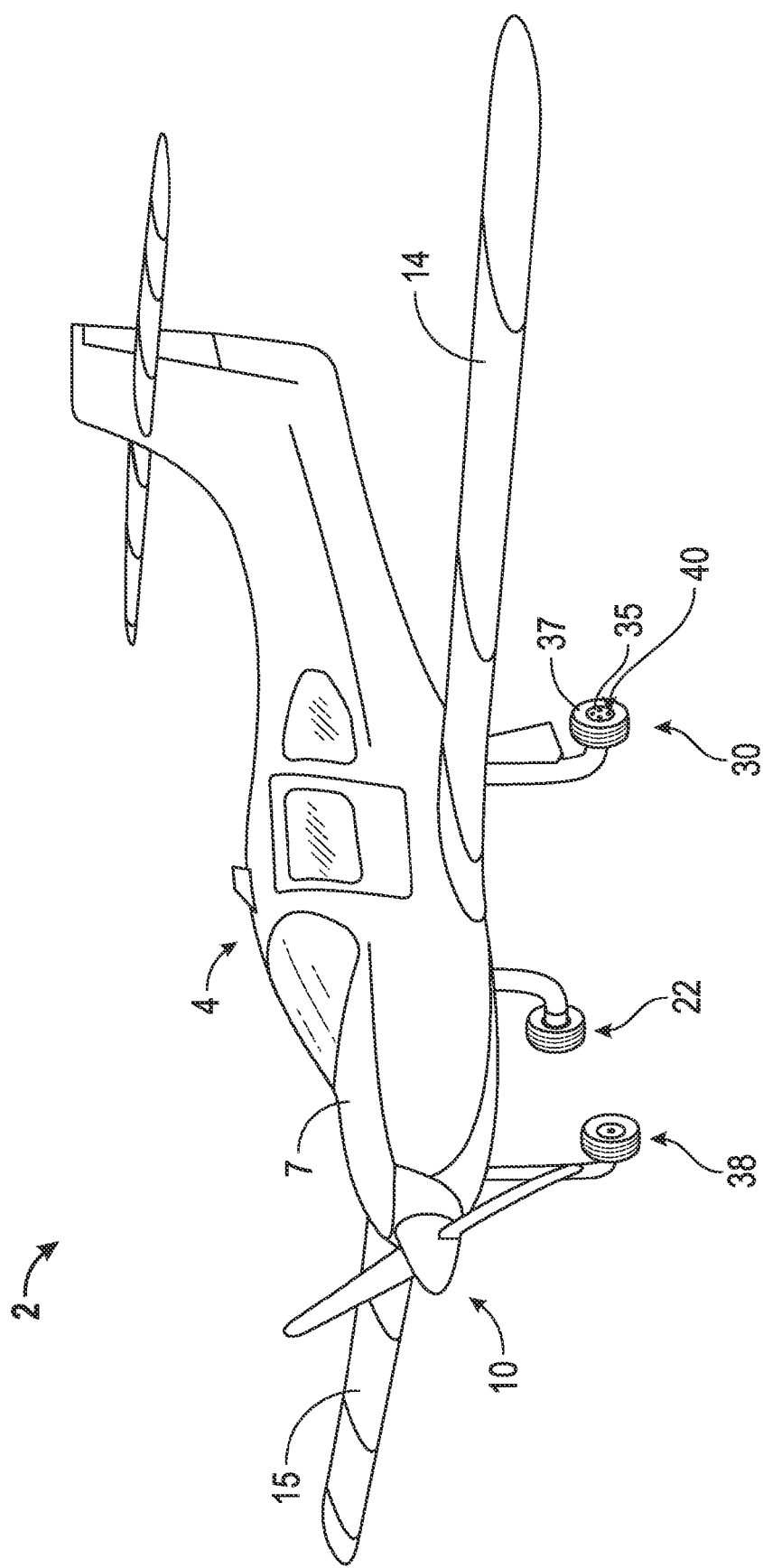
FIG. 1 is a perspective view of an aircraft including a braking system.

Referring to FIG. 1, a vehicle in accordance with an exemplary embodiment is indicated generally with reference numeral 2. The vehicle 2 is shown in the form of an aircraft 4. Although illustrated as an aircraft, it is to be understood that the vehicle 2 may take on other forms. The aircraft 4 includes a fuselage 7 including a nose section 10 and a tail section (not shown). The aircraft 4 also includes a first wing 14 extending from a first side of the fuselage 7 and a second wing 15 extending from an opposite of the fuselage 7. The aircraft 4 is shown to include a forward landing gear 22 arranged near the nose section 10 as well as aft landing gear 30 mounted to the first wing 14. A landing gear 30 includes a wheel 35 that supports a tire 37. It should be understood that the second wing 15 also includes a landing gear 38. In accordance with an exemplary embodiment, the landing gear 30 includes a braking system 40 and the wheel 35. The braking system 40 may also be provided on the aft landing gear 30 as well as the landing gear 38 provided on the second wing 15.

Figure 2:
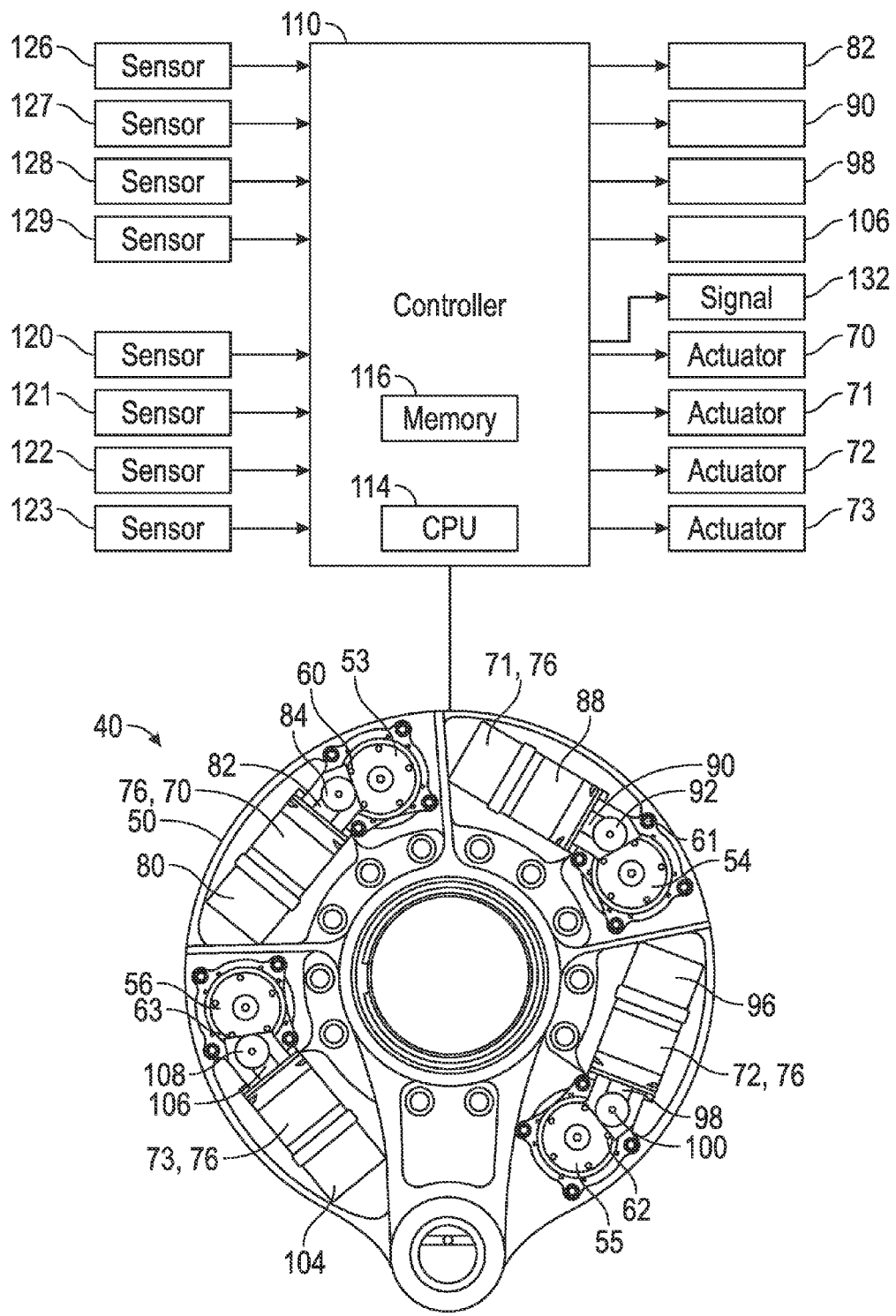
FIG. 2 is a partial plan view of a the braking system of FIG. 1.

As shown in FIG. 2, the braking system 40 includes a support plate 50 having mounted thereto a first brake actuation member 53, a second brake actuation member 54, a third brake actuation member 55 and a fourth brake actuation member 56. The first brake actuation member 53 includes a first gear member 60, the second brake actuation member 54 includes a second gear member 61, the third brake actuation member 55 includes a third gear member 62, and the fourth brake actuation member 56 includes a fourth gear member 63. The braking system 40 also includes a first brake actuator 70, a second brake actuator 71, a third brake actuator 72, and a fourth brake actuator 73. Each of the brake actuators 70-73 comprise a motor 76 and/or are driven by the motor 76. In one embodiment, the motor 76 is a brushless DC motor. As will be detailed more fully below, the brake actuators 70-73 act upon corresponding ones of the gear members 60-63, thereby causing the brake actuation members 53-56 to act upon braking elements (not shown). The braking elements apply a frictional force to braking members (also not shown) on the wheel 35 (FIG. 1). The frictional force causes rotation of the wheel 35 to slow bringing the aircraft 4 to a stop.

The brake actuator 70 includes a coil assembly 80 that acts upon a gear drive 82 that drives an actuator plate or gear element 84. Similarly, the brake actuator 71 includes a coil assembly 88 that acts upon a gear drive 90 that drives an actuator plate or gear element 92. The brake actuator 72 includes a coil assembly 96 that acts upon a gear drive 98 which, in turn, drives an actuator plate or gear element 100. The brake actuator 73 includes a coil assembly 104 that acts upon a gear drive 106 that drives an actuator plate or gear element 108. Thus, in accordance with an aspect of an exemplary embodiment, the brake actuators 70-73 take the form of electro-mechanical actuators or EMAs. With this arrangement, application of an electric current to the coil assemblies 80, 88, 96 and 104 causes respective ones of the gear drives 82, 90, 98 and 106 to the drive gear elements 84, 92, 100 and 108 against corresponding ones of the gear members 60-63 leading to a brake activation. The gear elements 84, 92, 100 and 108 may be planetary gear arrangements, for example.

In accordance with an exemplary embodiment, the braking system 40 includes a controller 110 operatively connected to the braking actuators 70-73. The controller 110 includes a central processing unit (CPU) 114 and a memory 116. The braking system 40 also includes a first angular sensor 120, a second angular sensor 121, a third angular sensor 122, and a fourth angular sensor 123. The angular sensors 120-123 are linked to the controller 110 and are operatively associated with respective ones of the braking actuators 70-73. The angular sensors 120-123 may take on numerous forms suitable to detect an angular position of the motor 76 configured to drive the brake actuators 70-73. Detection of angular positions of the motor 76, and thereby the actuators 70-73, assists in facilitating necessary control over the motor 76 and the actuators 70-73. The rotational motion of the motor 76 is converted to linear displacement of the gear drives 82, 90, 98 and 106, which may be referred to as a linear translation arrangement. In one embodiment, the gear drives 82, 90, 98 and 106 are ball screw arrangements configured to facilitate brake activation.

The braking system 40 also includes a first linear sensor 126, a second linear sensor 127, a third linear sensor 128 and a fourth linear sensor 129. The linear sensors 126-129 are linked to the controller 110 and are operatively associated with the gear drives 82, 90, 98 and 106, respectively. As with the angular sensors 120-123, the linear sensors 126-129 may take the form of any suitable sensor configured to detect a linear position of the gear drives 82, 90, 98 and 106. As described below, data obtained from the angular sensors 120-123 and the linear sensors 126-129 provides an ability to detect a failure condition of the brake actuators 70-73 or an associated component within the braking system 40. Data obtained from the angular sensors 120-123 and/or the linear sensors 126-129 may be transmitted as a signal 132 to a media for storage or communication purposes.

Figure 3:
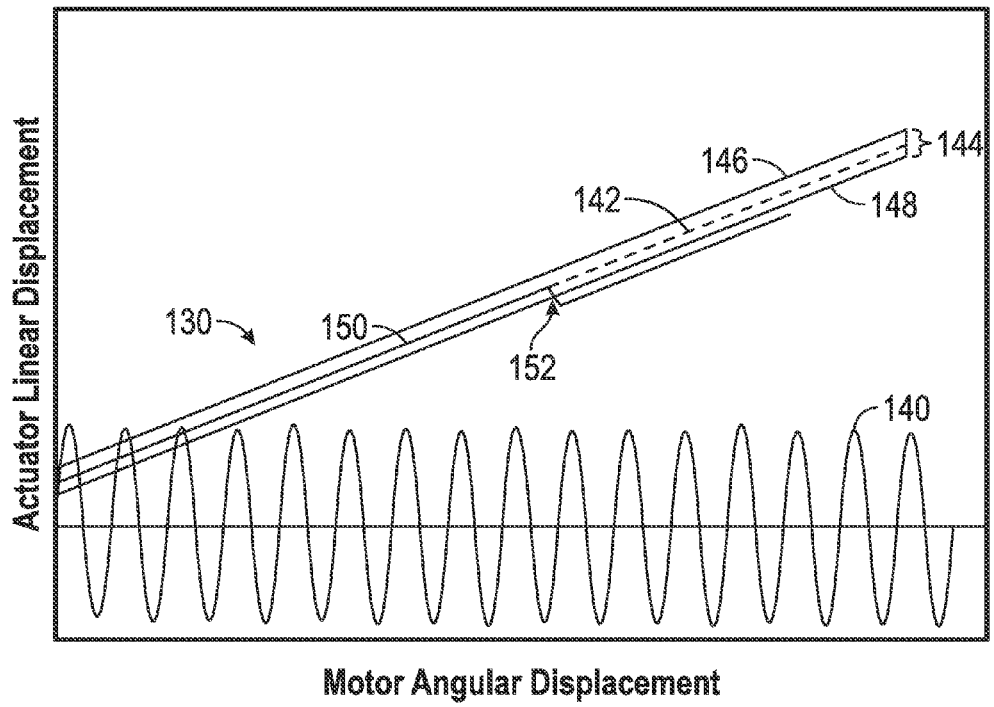
FIG. 3 is a plot of positional locations of components of the braking system.

Referring now to FIG. 3, positional data is shown for a portion of an operating range of the braking system 40 is illustrated. Specifically, a plurality of linear positions 130 of the gear drives 82, 90, 98 and 106 are illustrated as a function of angular displacement of the motor 76. The plurality of linear positions 130 corresponds to a plurality of angular positions 140 of the motor 76. For each of the angular positions 140, an ideal linear position 142 is known and stored in the memory 116 of the controller 110. A predetermined range of linear positions 144 comprises a margin of error from the ideal linear position 142 of the gear drives 82, 90, 98 and 106. As shown, the predetermined range of linear positions 144 includes an upper limit 146 and a lower limit 148 defining an acceptable range of linear positions. The predetermined range of linear positions 144 accounts for various potential system errors and hysteresis. An actual linear position 150 is illustrated and a failure condition 152 is illustrated at a point of deviation from the predetermined range of linear positions 144.

Figure 4:
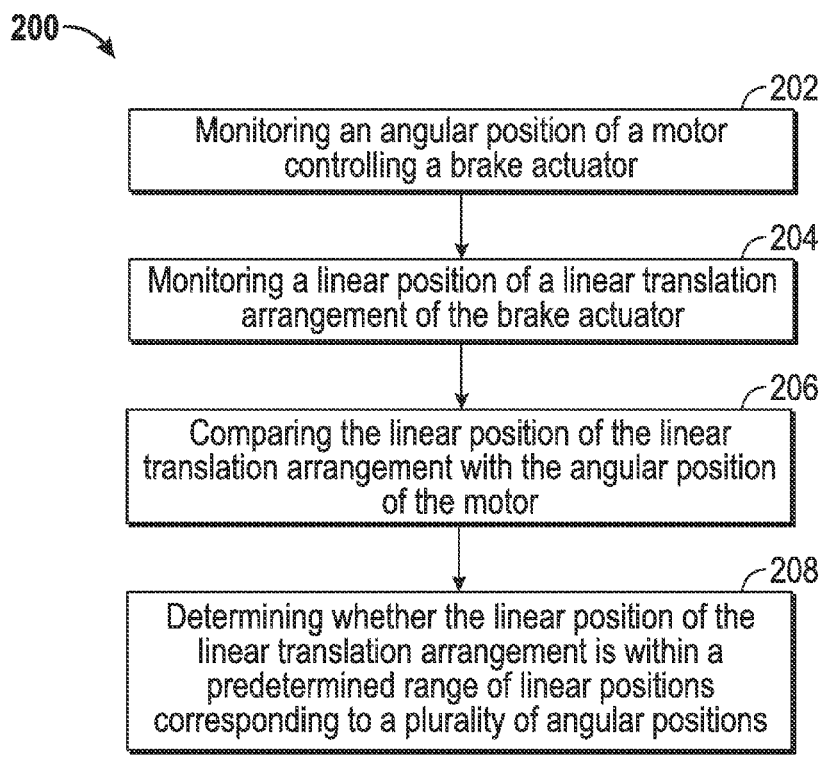
FIG. 4 is a flow diagram illustrating a method of detecting a failure of a brake actuator of the braking system.

A method of detecting a failure of a brake actuator 200 is also provided as illustrated in FIG. 4 and with reference to FIGS. 1-3. The aircraft 4 and more particularly the braking system 40 have been previously described and specific structural components need not be described in further detail. The method of detecting a failure of a brake actuator 200 includes monitoring an angular position of a motor controlling the brake actuator 202. A linear position of a linear translation arrangement of the brake actuator is monitored 204, where the linear position of the linear translation arrangement is controlled by a gear assembly in communication with the motor and the linear translation arrangement. The linear position of the linear translation arrangement is compared with the angular position of the motor 206. A determination is made whether the linear position of the linear translation arrangement is within a predetermined range of linear positions corresponding to a plurality of angular positions 208, which leads to detection of a failure condition of the brake actuator or an associated component of the braking system 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of detecting a failure of a brake actuator comprising:
monitoring an angular position of a motor controlling the brake actuator;
monitoring a linear position of a linear translation arrangement of the brake actuator, wherein the linear position of the linear translation arrangement is controlled by a gear assembly in communication with the motor and the linear translation arrangement;
comparing the linear position of the linear translation arrangement with the angular position of the motor; and
determining whether the linear position of the linear translation arrangement is within a predetermined range of linear positions corresponding to a plurality of angular positions.

2. The method of claim 1, wherein the linear translation arrangement comprises a ball screw assembly.

3. The method of claim 1, wherein the angular position comprises an angular displacement of the motor.

4. The method of claim 1, wherein the predetermined range of linear positions comprises a margin of error from an ideal linear position.

5. The method of claim 1, further comprising calculating at least one system error, the system error comprising a hysteresis range.

6. The method of claim 5, wherein the predetermined range of linear positions corresponds to at least one system error.

7. The method of claim 1, wherein the linear translation arrangement comprises a gear drive.

8. The method of claim 1, further comprising determining a failure condition of the brake actuator if the linear position is not within the predetermined range of linear positions.

9. A braking system comprising:
a support plate;
at least one brake actuator operably coupled to the support plate, the at least one brake actuator including an actuator plate in communication with a gear assembly for converting rotational motion to linear motion of a linear translation arrangement;
an angular position sensor for determining an angular position of a motor of the at least one brake actuator;
a linear position sensor for determining a linear position of the linear translation arrangement; and
a controller for determining whether the linear position is within a predetermined range of linear positions corresponding to a plurality of angular positions.

10. The braking system of claim 9, wherein the linear translation arrangement comprises a ball screw assembly.

11. The braking system of claim 9, wherein the linear translation arrangement comprises a gear drive.

12. The braking system of claim 9, wherein the at least one brake actuator comprises an electro-mechanical actuator.

13. The braking system of claim 9, wherein the braking system is part of an aircraft.

14. The braking system of claim 9, further comprising a failure condition corresponding to a linear position outside of the predetermined range of linear positions.

15. The braking system of claim 9, wherein the angular position comprises an angular displacement of the motor.

16. The braking system of claim 9, wherein the predetermined range of linear positions comprises a margin of error from an ideal linear position.

* * * * *